(12) United States Patent
Kubota

(10) Patent No.: US 6,917,707 B1
(45) Date of Patent: Jul. 12, 2005

(54) IMAGE PROCESSING METHOD AND IMAGE PROCESSING APPARATUS

(75) Inventor: Kazuhisa Kubota, Ikoma-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 717 days.

(21) Appl. No.: 09/672,361

(22) Filed: Sep. 28, 2000

(30) Foreign Application Priority Data

Sep. 28, 1999 (JP) .......................................... 11-275066

(51) Int. Cl.⁷ ............................................... G06K 9/34
(52) U.S. Cl. ...................... 382/176; 382/171; 358/462; 358/463
(58) Field of Search ............................... 382/162–180; 358/450–464

(56) References Cited

U.S. PATENT DOCUMENTS

| | | | | |
|---|---|---|---|---|
| 4,929,979 A | * | 5/1990 | Kimoto et al. .............. | 358/518 |
| 5,699,454 A | * | 12/1997 | Nakai et al. ................ | 382/172 |
| 5,761,338 A | * | 6/1998 | Kasamatsu .................. | 382/176 |
| 5,784,500 A | * | 7/1998 | Homma et al. ............. | 382/270 |
| 5,841,899 A | * | 11/1998 | Ide et al. .................... | 382/168 |
| 5,848,182 A | | 12/1998 | Kanamori ................... | 382/171 |
| 5,953,450 A | | 9/1999 | Kanamori ................... | 382/171 |
| 5,956,421 A | * | 9/1999 | Tanaka et al. .............. | 382/172 |
| 6,266,439 B1 | * | 7/2001 | Pollard et al. .............. | 382/164 |
| 6,389,162 B2 | * | 5/2002 | Maeda ........................ | 382/172 |

FOREIGN PATENT DOCUMENTS

| | | | | |
|---|---|---|---|---|
| JP | 3-30143 | 4/1991 | | |
| JP | 04-313744 | 11/1992 | | |
| JP | 06-178111 | 6/1994 | | |
| JP | 9-43915 | 2/1997 | | |
| JP | 01196971 A | * | 8/1998 | ............ H04N/1/40 |

* cited by examiner

*Primary Examiner*—Jingge Wu
(74) *Attorney, Agent, or Firm*—David G. Conlin; David A. Tucker; Edwards & Angell, LLP.

(57) ABSTRACT

A mono-color signal converter extracts a mono-color signal in terms of the CMY system from RGB signals. A histogram generator generates a density histogram based on the density of the pixels in the digital image. At the same time, based on the thresholds determined previously, determination areas for the background density and maximum density are formed. A density class extracting portion extracts the density class of the background density and the density class of the maximum density. Based on the result from the density class extracting portion, a density correction curve generator generates a density correction curve. When the density correction curve needs to be adjusted as desired, the starting point and end point of the density correction curve are renewed through a first correction value and second correction value setting portion. A signal converter converts the mono-color signal into the K-signal.

18 Claims, 11 Drawing Sheets

IMAGE PROCESSING METHOD AND IMAGE PROCESSING APPARATUS

BACKGROUND OF THE INVENTION (1) Field of the Invention

The present invention relates to an image processing method comprising the steps of converting input analog image signals into digital image signals, generating a density histogram of the pixels from the obtained digital signals and effecting density correction of the digital image based on the generated density histogram as well as to an image processing apparatus using the method. More detailedly, the present invention is to determine the background density and maximum density from the pixel density histogram of a target image and generate a density correction curve suited to the target image based on the determination.

(2) Description of the Prior Art

Widely used image forming apparatus such as electronic copiers are categorized into two classes, the conventional analog type and the digital type. Under such circumstances, typical analog copiers have been known to use an automatic exposure function, by varying the intensity of the exposure lamp based on the detection of the original density with an original density sensor, so as to provide optimal image quality. For digital copiers to realize such an automatic exposure function, there are proposals for automatic density control such as Japanese Patent Publication Hei 3 No.30143 (prior art 1), Japanese Patent Application Laid-Open Hei 8 No.204963(prior art 2) and Japanese Patent Application Laid-Open Hei 9 No.43915(prior art 3), for example, in which optimization of the image quality is effected based on the density histogram of a target image.

In the automatic density control in the conventional image forming apparatus, especially in the invention of the above prior art 1, sampling is performed periodically and at local peaks to generate a density histogram, and the pattern of this histogram is compared with the data stored in the ROM (read only memory), to thereby determine the type of an original, e.g., white background printed original, color background printed original, white background pencil written original or the like so as to output an image density control signal corresponding to the determined type.

In the invention disclosed in the above prior art 2, the positions of two peaks, i.e., 'white' and 'black' peaks, are determined based on the density histogram generated from a target image so as to decide reference values while the type of the image is determined based on the density histogram so as to correct the reference values. Tone correction is performed based on the thus corrected reference values.

Further in the invention disclosed in the above prior art 3, when reference values for density correction are determined with reference to frequency values of the density histogram, the density histogram is generated only for the original area even if the document cover is open, whereby it is possible to perform automatic density control without it being affected by the data of the area outside the original.

Concerning the conventional automatic density adjustment methods in image forming apparatus, in the case of the invention written in the prior art 1, data in ROM is used as the means for determining the type of an original. Therefore, for detailed determination, it is necessary to store the comparable data, which results in the need of a very large capacity ROM. Further, there may be cases where determination itself is impossible for special images, which limits the applicability of the machine.

In the cases of the prior art 2 and 3, the reference values for tone correction are determined based on the density histogram of a target image, it is impossible to determine whether the target image is of photographs or of characters. Therefore, if the density histogram does not present a true density distribution of the original as in the case where the image is composed of photographs and characters or in the case where there are a plurality of background tones, it is impossible to calculate the reference values for optimal correction, thereby making the automatic density control impossible or producing defective images. Further, in the case of prior art 3, since the process to be done when the document cover is open differs from that when it is closed, the operation itself becomes complicated.

In addition, in conventional digital image forming apparatus, especially that incorporating a manual density control device, upon the density control operation the user should make a trial copy to obtain the optimal density, or the user adjusts the density relying on experience. In either case, unnecessary and wasteful copying would have been done.

SUMMARY OF THE INVENTION

The present invention has been devised taking into consideration the above circumstance, and it is therefore an object of the present invention to provide an image processing method and an image processing apparatus which make easy determination of the background density and the maximum density and enable exact and efficient density control suited to each of various types of documents different in density conditions to be drawn with optimal image quality.

In order to achieve the above object, the present invention is configured as follows:

In accordance with the first feature of the present invention, an image processing method for density correction of a digital image by converting input analog image signals into digital image signals, generating a pixel density histogram from the digital image and making density correction of the digital image based on the generated density histogram, is characterized in that, for the density histogram, the first threshold representing the threshold density value for the background, the second threshold representing the minimum frequency for the background density value, the third threshold representing the threshold density value for the maximum density and the fourth threshold representing the minimum frequency for the maximum density have been set beforehand, and the image processing method comprises the steps of: from the total density range of the density histogram, defining as the background density determination area the range having the density values determined based on the first threshold and having a frequency equal to or greater than the second threshold and defining as the maximum density determination area the range having the density values determined based on the third threshold and having a frequency equal to or greater than the fourth threshold;

determining as the background density a density class which is closest to the first threshold, of all the density classes which belong to the background density determination area;

determining as the maximum density a density class which is farthest from the third threshold, of all the density classes which belong to the maximum density determination area; and performing density correction based on the density classes of the background and the maximum density.

In accordance with the second feature of the present invention, the image processing method having the above first feature is characterized in that the frequencies in the background density determination area are sequentially compared with the second threshold, in the direction departing from the first threshold so as to determine the first density class having a frequency over the second threshold as the background density.

In accordance with the third feature of the present invention, the image processing method having the above first feature is characterized in that the frequencies in the maximum density determination area are sequentially compared with the fourth threshold, in the direction approaching the third threshold so as to determine the first density class having a frequency over the fourth threshold as the maximum density.

In accordance with the fourth feature of the present invention, the image processing method having the above first feature, further comprises the steps of:

setting the density class which has been determined as the background density from the background density determination area, as the first reference value and adding a previously designated first correction value to the first reference value to produce a first corrected reference value;

setting the density class which has been determined as the maximum density from the maximum density determination area, as the second reference value and adding a previously designated second correction value to the second reference value to produce a second corrected reference value;

generating a density correction curve starting from the first corrected reference value and ending at the second corrected reference value; and performing density correction based on the density correction curve.

In accordance with the fifth feature of the present invention, the image processing method having the above fourth feature is characterized in that the first and second correction values can be adjusted arbitrarily.

In accordance with the sixth feature of the present invention, an image processing apparatus comprises:

a histogram generator which converts input analog image signals into digital image signals and generates a density histogram from the density of all the pixels in the digital image;

a density correcting portion for making density correction of the digital image based on the histogram generated by the histogram generator; and a density class extracting portion for extracting the density classes corresponding to the background and the maximum density from all the density classes in the density histogram generated by the histogram generator, and is characterized in that the histogram generator further comprises:

a density area divider for dividing the total density area of pixels of the digital image into multiple number of density classes; and a density area generator, counting the frequencies of the density classes divided by the density area divider, defining as a background density determination area the range having the density values determined based on the first threshold and having a frequency equal to or greater than the second threshold and defining as a maximum density determination area the range having the density values determined based on the third threshold and having a frequency equal to or greater than the fourth threshold, in the total density range of the density histogram, based on the first threshold representing the threshold density value for the background, the second threshold representing the minimum frequency for the background density value, the third threshold representing the threshold density value for the maximum density and the fourth threshold representing the minimum frequency for the maximum density, all having been set beforehand, wherein the density class extracting portion determines as the background density a density class which is closest to the first threshold, of all the density classes which belong to the background density determination area and determines as the maximum density a density class which is farthest from the third threshold, of all the density classes which belong to the maximum density determination area.

In accordance with the seventh feature of the present invention, the image processing apparatus having the above sixth feature is characterized in that the density class extracting portion sequentially compares the frequencies in the background density determination area with the second threshold, in the direction departing from the first threshold so as to determine the first density class having a frequency over the second threshold as the background density.

In accordance with the eighth feature of the present invention, the image processing apparatus having the above sixth feature is characterized in that the density class extracting portion sequentially compares the frequencies in the maximum density determination area with the fourth threshold, in the direction approaching the third threshold so as to determine the first density class having a frequency over the fourth threshold as the maximum density.

In accordance with the ninth feature of the present invention, the image processing apparatus having the above sixth feature is characterized in that the density correcting portion sets the density class which has been determined as the background density from the background density determination area, as the first reference value and adding a previously designated first correction value to the first reference value to produce a first corrected reference value, sets the density class which has been determined as the maximum density from the maximum density determination area, as the second reference value and adding a previously designated second correction value to the second reference value to produce a second corrected reference value, generates a density correction curve starting from the first corrected reference value and ending at the second corrected reference value, and performs density correction based on the density correction curve.

In accordance with the tenth feature of the present invention, the image processing apparatus having the above ninth feature, further comprises a correction value setting portion for allowing the first and second correction values to be adjusted arbitrarily.

According to the present invention, a density class which is closest to the first threshold, of all the density classes which belong to the background density determination area are determined as the background density while a density class which is farthest from the third threshold, of all the density classes which belong to the maximum density determination area are determined as the maximum density, so as to perform density correction based on the density classes of the background and the maximum density. In this way, optimal density correction can be performed for a variety of originals and images, it is possible to provide the optimized tone processing for any image and hence produce a high-quality preferable output image.

DESCRIPTION OF THE PREFERRED EMBODIMENTS

The embodiment of the present invention will hereinafter be described in detail with reference to the accompanying drawings.

Figure 1:
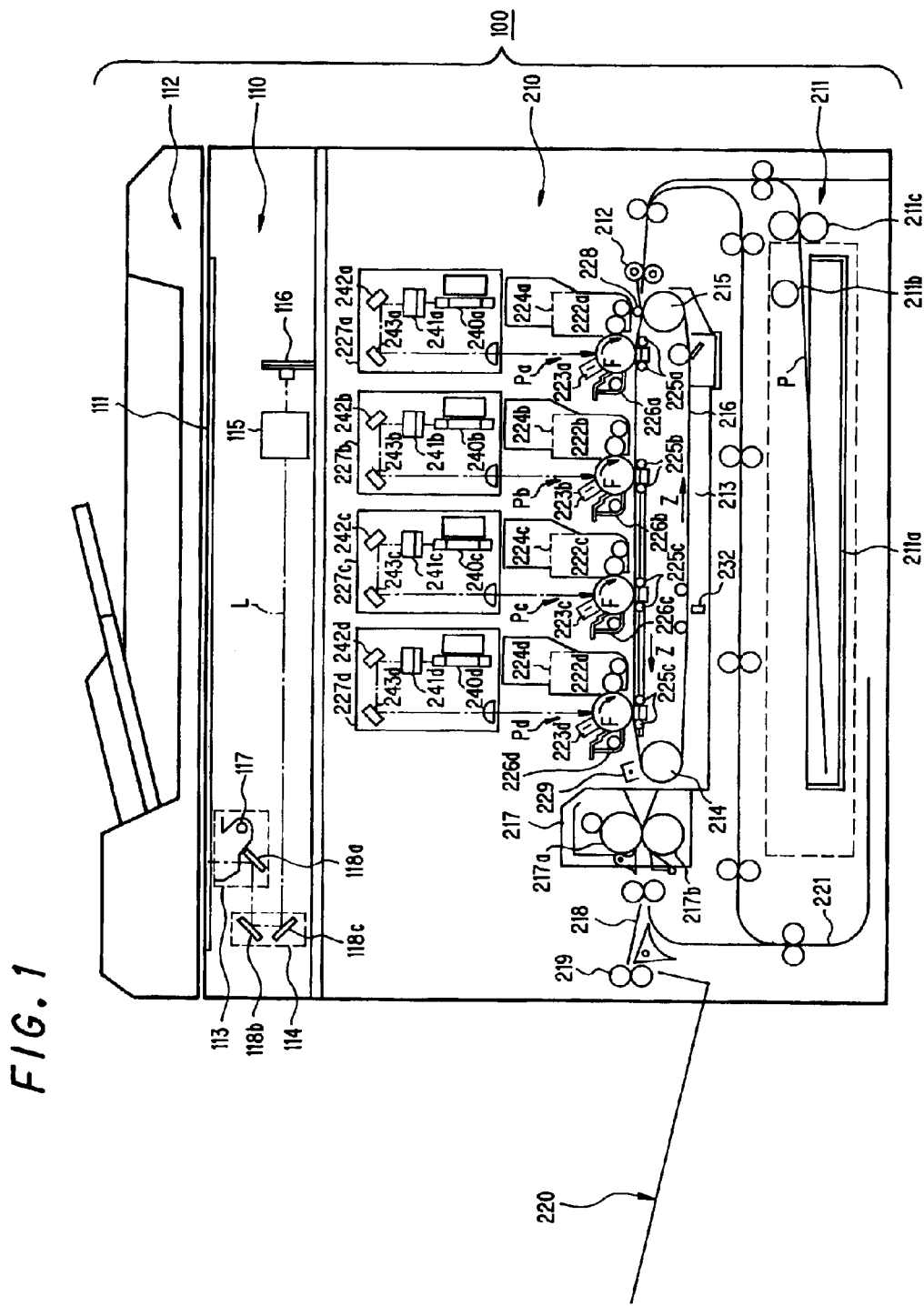
FIG. 1 is a view showing the overall configuration of an image forming apparatus incorporating an image processing apparatus in accordance with the present invention.

FIG. 1 is a view showing an overall configuration of a digital color copier as the image forming apparatus of this embodiment. As shown in FIG. 1, this image forming apparatus body 100 has a color image input unit 110 and a color image output unit 210 within while an original table 111 and an unillustrated control panel are arranged on the top of the body.

A reversing automatic document feeder (RADF) 112 is arranged on the top surface of original table 111 in the predetermined position whilst being supported so as to be opened and closed with respect to the original table 111 surface.

RADF 112 conveys a set original so that its one side opposes color image input unit 110 made up of a scanner portion, for example, at the predetermined position on the original set surface of original table 111. After image reading of this side of the original is completed by color image input unit 110, the original is inverted and conveyed to original table 111 so that the other side of the original opposes color image input unit 110 at the predetermined position on the original set surface of original table 111. When the image on the other side of the original is read by color image input unit 110 and reading of one sheet of the original is finished, the original is discharged and the duplex copy conveying operation for a next document is effected. In this case, the operation of the conveyance and face inversion of the original effected by RADF 112 is controlled in association with the drive operation of image forming apparatus body 100.

The scanner portion of color image input unit 110 for reading the image of the original placed on the original set surface of original table 111 is configured of first and second scanning units 113 and 114 which reciprocate along, and in parallel to, the undersurface of the original set surface of original table 111, an optical lens 115 and a CCD (charge coupled device) line sensor 116 as a photoelectric converting device.

The first scanning unit 113 constituting the scanner portion includes an exposure lamp 117 for illuminating the original image surface and a first mirror 118a for deflecting the reflection light image L from the original which is illuminated by exposure lamp 117, in the predetermined direction. This first scanning unit 113 is adapted to move in a reciprocating manner in parallel with, whilst being kept a certain distance away from, the undersurface of the original set surface of original table 111 at the predetermined speed. Second scanning unit 114 has second and third mirrors 118b and 118c which deflect the reflected light image L from the original, deflected by first mirror 118a of first scanning unit 113, in the predetermined direction. This second scanning unit is controlled so as to move in a reciprocating manner at a speed related to that of first scanning unit 113 and in parallel thereto.

Optical lens 115 reduces the reflected light image L from the original, thus deflected by third mirror 118c of second scanning unit 114, so that the reduced light image will be focused on the predetermined position on CCD line sensor 116.

CCD line sensor 116 is a three-line color CCD which can read monochrome and color images and output line data as to 20 color separation components R(red), G(green) and B(blue). CCD line sensor 116 photoelectrically converts the light image focused by optical lens 115, sequentially, into an electric signal and outputs it. The original image information thus obtained as the electric signal is further transferred to an aftermentioned image processor 10 where the predetermined image data processes are performed.

Arranged in the bottom of image forming apparatus body 100 is a paper feed mechanism 211, which conveys a sheet of paper P as a recording medium into color image output unit 210. This paper feed mechanism 211 separates paper P, one by one, from a stack of paper held in a paper feed tray 211a, by means of a pickup roller 211b and feeds it to a pair of registration rollers 212 by means of a pair of conveyance rollers 211c. The paper P thus separated is delivered with its timing controlled by registration roller pair 212 to the upstream side of a conveyer and transfer belt mechanism 213 disposed in the lower portion of color image output unit 210.

Conveyer and transfer belt mechanism 213 is composed of a driving roller 214, an idle roller 215 and a conveyer and transfer belt 216 which is wound and tensioned substantially parallel between the two rollers so as to form a paper conveyance path and convey paper P from paper feed mechanism 211 in the conveyance direction Z as being electrostatically attracted to the belt. Further, a pattern image detecting unit 232 is provided under and in proximity to conveyer and transfer belt 216.

Arranged downstream of conveyer and transfer belt mechanism 213 is a fixing unit 217. This fixing unit 217 has a pair of fixing rollers 217a and 217b. Paper P with toner images successively transferred and formed thereon by aftermentioned image forming stations Pa to Pd is conveyed through the nip between these fixing rollers 217a and 217b so that the toner image is fixed on paper P. Paper P having passed through fixing unit 217 with the toner image fixed thereon is conveyed toward a conveyance direction switching gate 218. This switching gate 218 is controlled so as to selectively connect the conveyance path of paper P after fixing with either the path to directly discharge paper P to a paper output tray 220 by means of a paper discharge roller 219 or the switchback path to recirculate paper P after fixing toward color image output unit 210. The paper P which has been conveyed to switchback conveyance path 221 is face-inverted and then re-fed to image forming stations Pa to Pd at the timing of image forming of color image output unit 210. This flow of procedures enables a duplex copy operation.

The aforementioned image forming stations Pa to Pd, namely, the first image forming station Pa, the second image forming station Pb, the third image forming station Pc and the fourth image forming station Pd are arranged above, and in proximity to, conveyer and transfer belt 216, in the above mentioned order from the upstream side of the paper conveyance path.

All the image forming stations Pa to Pd are of a substantially identical configuration. Each image forming station Pa, Pb, Pc and Pd has a photosensitive drum 222a, 222b, 222c and 222d, which is the image support and is driven in the rotational direction indicated by arrow F. Provided around each photosensitive drum 222a to 222d, are a primary charger 223a, 223b, 223c and 223d for uniformly charging photosensitive drum 222a–222d, a developing unit 224a, 224b, 224c and 224d for developing the static latent image formed on photosensitive drum 222a–222d which has been charged by each charger 223a to 223d, a transfer device 225a, 225b, 225c and 225d for transferring to paper P the toner image developed on photosensitive drum 222a–222d by developing unit 224a to 224d, a cleaning unit 226a, 226b, 226c and 226d for removing the leftover toner from the surface of photosensitive drum 222a–222d after the transfer stage, in this order with respect to the rotational direction of each photosensitive drum 222a–222d.

Arranged above photosensitive drums 222a to 222d are laser beam scanner units 227a, 227b, 227c and 227d, respectively. Each laser beam scanner unit 227a–227d has a semiconductor laser element (not shown) for emitting a beam modulated in accordance with an image data stream from an aftermentioned image processor 10 and deflects the laser beam from the semiconductor laser element in the main scan direction by means of a polygon mirror 240a, 240b, 240c and 240d.

The laser beam deflected by polygon mirror 240a–240d is focused on the surface of photosensitive drum 222a–222d by means of an f-theta(θ) lens 241a, 241b, 241c and 241d and a deflecting mirror 242a, 242b, 242c and 242d and a deflecting mirror 243a, 243b, 243c and 243d.

Further, laser beam scanner units 227a to 227d are supplied with the pixel signals corresponding to the black component image, the cyan color component image, the magenta color component image, the yellow color component image of a color original image from aftermentioned image processor 10, respectively. Thereby, the static latent images corresponding to the color separations of the original image information are formed on photosensitive drums 222a to 222d, respectively.

In color image output unit 210, the static latent images corresponding to the original image information and formed on photosensitive drum 222a–222d are developed by means of developing units 224a, 224b, 224c and 224d which hold black toner, cyan color toner, magenta color toner, yellow color toner, respectively and reproduced as the toner images.

Provided between registration roller pair 212 of paper feed mechanism 211 and the first image forming station Pa on the upstream side of the image forming portion is a paper-attraction charger 228. This paper-attraction charger 228 electrifies the conveyer and transfer belt 216 surface so that paper P fed from paper feed mechanism 211 through registration roller pair 212 is stably and reliably conveyed without any paper slip or slide, whilst being attracted to conveyer and transfer belt 216, from the first image forming station Pa to the fourth image forming station Pd.

An erasing charger 229 is arranged more or less directly above driving roller 214, for driving conveyer and transfer belt 216, located between the fourth image forming station Pd arranged on the downstream side of the image forming portion and fixing roller 217. This erasing device 229 applies an a.c. voltage to conveyer and transfer belt 216 so that paper P electrostatically attracted to conveyer and transfer belt 216 will be readily separated from the belt which has been charged by paper-attraction charger 228.

In the thus configured digital color image forming apparatus, first, a stack of cut-sheet type paper used as paper P is set to paper feed cassette 211a of paper feed mechanism 211. When the copy operation of image forming apparatus body 100 is activated, paper P is picked up, sheet by sheet, from paper feed cassette 211a and delivered to the paper conveyance path. Then, the leading edge of paper P is detected by a sensor (not shown), which outputs a detection signal, based on which registration roller pair 212 operates and stops paper P briefly before the image forming portion.

Paper P thus stopped briefly before the image forming portion is delivered in time with the operation of image forming stations Pa to Pd by color image output unit 210, onto conveyer and transfer belt 216, which has been charged beforehand by paper attraction charger 228. Thus, the paper is stably conveyed throughout the passage of all the image forming stations Pa to Pd whilst being electrostatically attracted to conveyer and transfer belt 216.

In each image forming stations Pa to Pd, the toner image of each color corresponding to the original image information is formed on photosensitive drum 222a to 222d. These images of different colors are superimposed onto the support surface of paper P which is conveyed whilst being electrostatically attracted by conveyer and transfer belt 216, as the paper passes through first to fourth image forming stations Pa to Pd.

When transfer of the image formed by the fourth image forming station Pd is completed, paper P is separated by virtue of erasing charger 229, continuously starting at its leading edge, from-conveyer and transfer belt 216 and introduced into fixing unit 217. Finally, paper P having the toner image fixed thereon by fixing unit 217 is discharged onto paper output tray 220 by means of paper discharge roller 219. When duplex copy is performed on paper P, the paper P after fixing is conveyed to switchback conveyance path 221 by way of switching gate 218, where the paper is face-inverted. The paper then is re-fed to image forming stations Pa to Pd in time with the image forming of color image output unit 210, to thereby perform duplex copy.

In the above description of the embodiment of the digital color image forming apparatus, writing to the photosensitive drums 222a to 222d is performed by laser beam scanning exposure using laser beam scanner units 227a to 227d. However, instead of the laser beam scanner units, another optical writing system such as an LED (light emitting diode) head made up of an LED array with a focusing lens array may be used. An LED head is smaller in size compared to a laser beam scanner unit and has no moving parts hence is silent. Therefore, this LED head can be preferably used for digital color image forming apparatus of a tandem arrangement type which needs multiple optical writing units.

Figure 2:
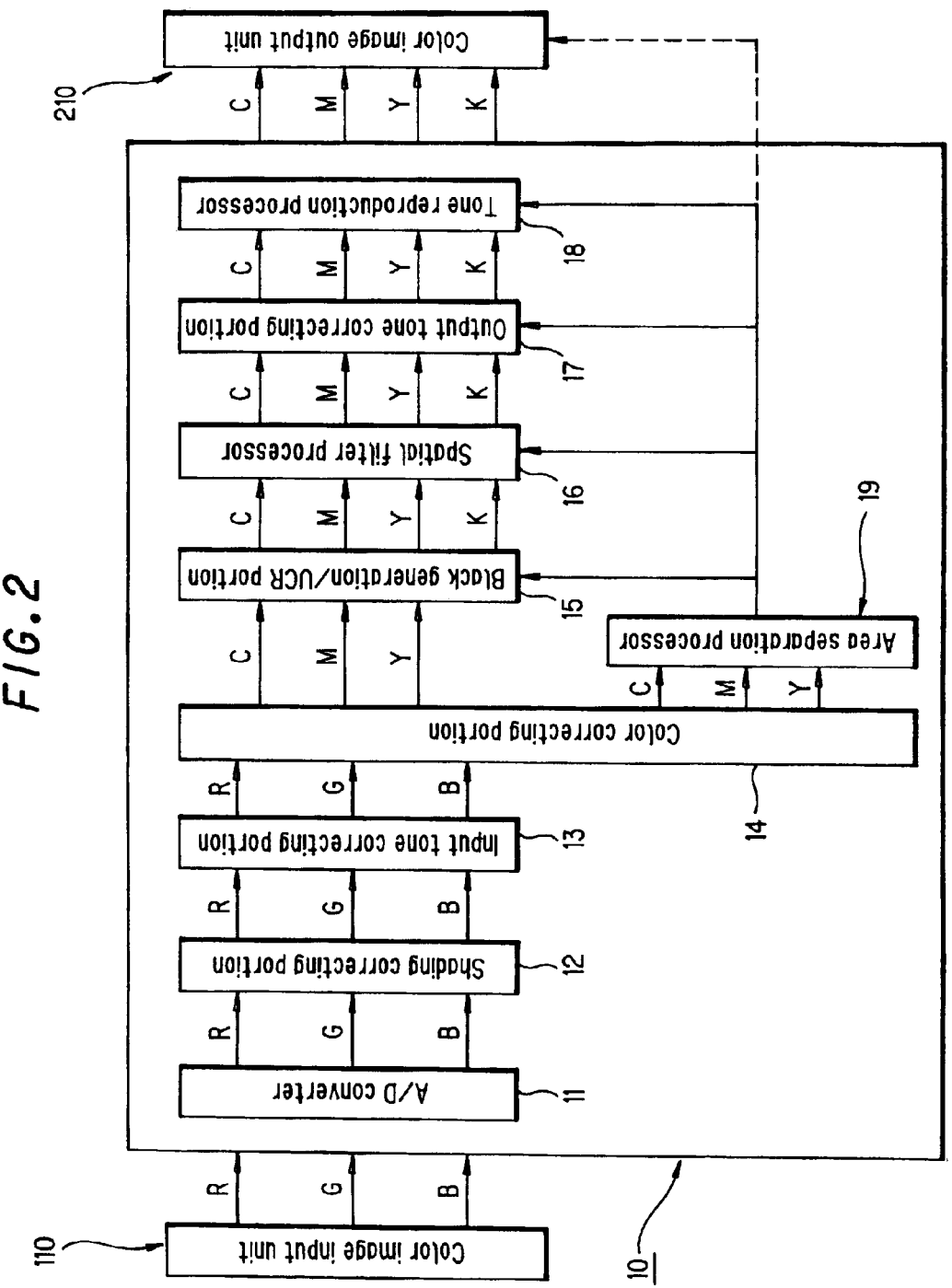
FIG. 2 is a block diagram showing a configuration of a typical image processing apparatus.

FIG. 2 is a block diagram showing the image processor. This image processor 10 includes: an A/D (analog-to-digital) converter 11, a shading correcting portion 12, an input tone correcting portion 13, a color correcting portion 14, a black generation/under color removal (UCR) portion 15, a spatial filtering processor 16, an output tone correcting portion 17, a tone reproduction (halftone generation) processor 18 and an area separation processor 19.

As already mentioned, color image input unit 110 is provided with CCD line sensor 116, which reads the reflected light image L from the original image to generate the first calorimetric RGB(R: red, G: green, B: blue) analog signals. A/D converter 11 then converts these RGB signals into digital mode. The RGB digital image signals thus converted by A/D converter 11 is sent to shading correcting portion 12, where the correcting process for removing various types of distortions arising from the illuminating system, focusing system and imaging system in color image input unit 110 is effected.

The RGB image signals after the correcting process of shading correcting portion 12 are sent to input tone correcting portion 13. This input tone correcting portion 13 performs correcting processes such as the color balance adjustment of the RGB reflectance signals as well as conversion of the image signals into easily handled signals on the image processing system, such as the density signal and the like. The input tone correcting portion also performs automatic exposure control, described later. The RGB image signals thus corrected through input tone correcting portion 13 are sent to a color correcting portion 14. In order to realize faithful color representation, this color correcting portion 14 converts the RGB image signal into the CMY (C: cyan, M: magenta, Y: yellow) image signals of the second calorimetric system to perform the correction of removing muddy color components based on the spectral characteristics of the CMY coloring materials including unnecessary absorbing components.

The CMY image signals after color correction by color correcting portion 14 are sent to black generation/undercolor removal portion 15. This black generation/undercolor removal portion 15 generates a black (K) image signal from the three CMY color image signals after color correction and subtracts the thus obtained K signal by the black generation from the original CMY signals to generate new CMY image signals. The thus obtained new three CMY color image signals are converted into four color or CMYK image signals. The CMYK image signals thus processed and converted by black generation/undercolor removal portion 15 are sent to spatial filtering processor 16. This spatial filtering processor 16 performs a spatial filtering process using digital filters, in order to correct the spatial frequency characteristics of the CMYK image signals. This process suppresses the blurring and degradation of graininess of the output image.

The CMYK image signals thus processed through spatial filtering processor 16 is sent to an output tone correcting portion 17. This output tone correcting portion 17 performs output tone correction, for example, conversion of the density signal into the dot percent as a characteristic value of color image output unit 210. The CMYK image signals thus corrected by output tone correcting portion 17 are sent to tone reproduction processor 18. This tone reproduction processor 18 performs the tone reproducing process (halftone generating process) by dividing the image into pixels to reproduce a variety of tones.

The CMY image signals thus color corrected through color correcting portion 14 is sent to an area separating processor 19. This area separating processor 19 separates the image into different image areas, i.e., character area, photographic area, halftone area and subjects each area to the appropriate process to thereby reproduce the input image faithfully.

For an image area which was determined and extracted as 'characters' or 'black characters (including colored characters in some cases)' by area separating processor 19, the high-frequency range in the sharpness emphasis process in spatial filtering processor 16 is enhanced to a higher degree. At the same time, in tone reproduction processor (halftone generator) 18 for reproducing tones of pixels, the area is subjected to binarization or multithresholding using a high definition screen suitable for high-frequency reproduction. On the other hand, for an image area which was determined as 'photographs' by area separating processor 19, low-pass filtering is effected in spatial filtering processor 16 in order to remove the input dot component while binarization or multithreholding is effected in tone reproduction processor 18, using a screen with special importance attached to tone reproducibility.

In this way, the image data having undergone various processes through the above image processor 10 is temporarily stored in an unillustrated storage portion. The image data is loaded from this storage portion at the predetermined timing to be supplied to color image output unit 210, where the input image data is output on paper P as a recording medium.

Figure 3:
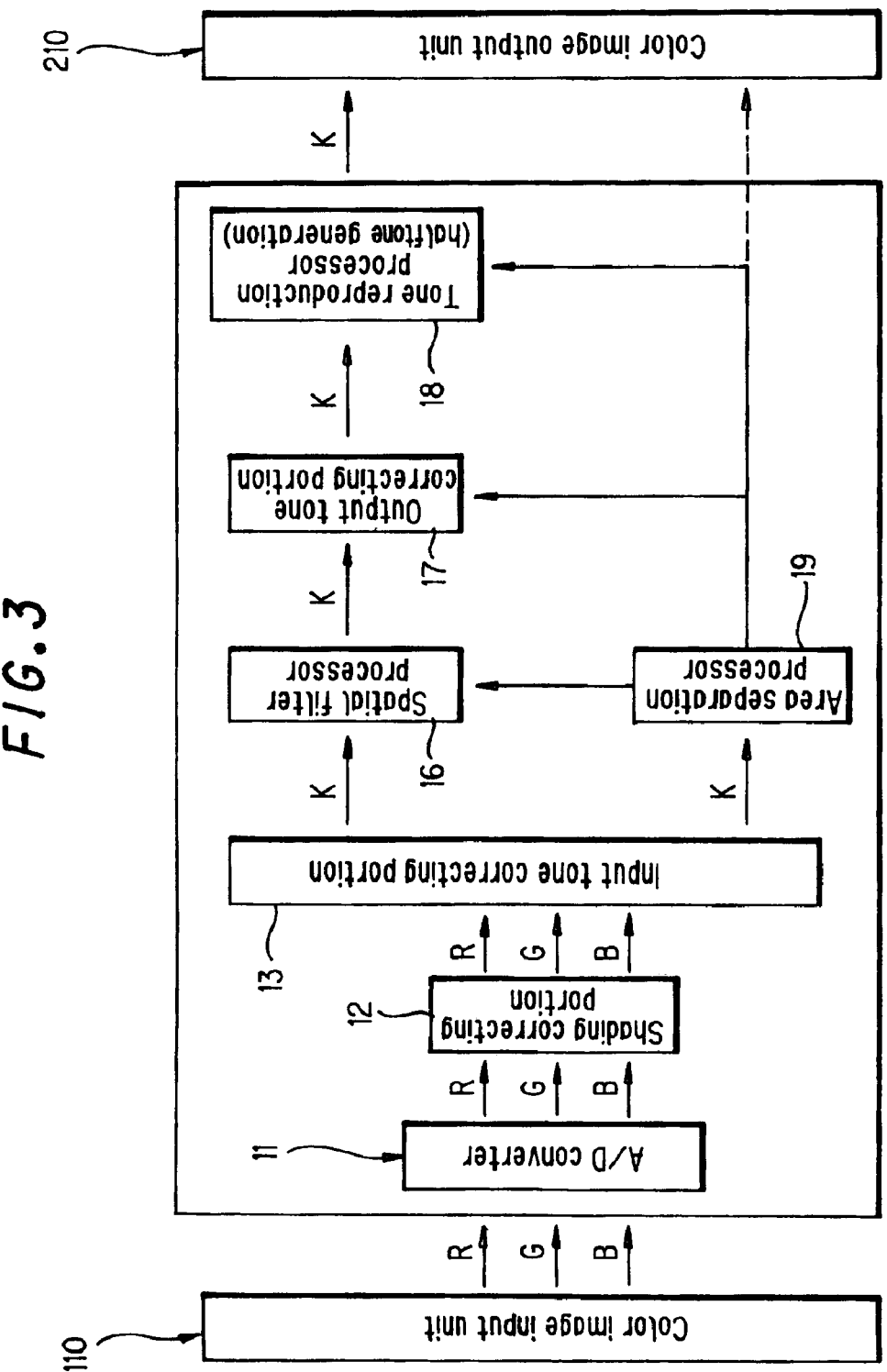
FIG. 3 is a block diagram showing a configuration of an image processing apparatus to be used for automatic exposure control.

The automatic exposure control in image processor 10 is effected in input tone correcting portion 13. When automatic exposure control is effected, the processes effected by the aforementioned color correcting portion 14 and black generation/undercolor removal portion 15 are omitted. That is, when 'automatic exposure control mode' is selected through the control portion (not shown) in image forming apparatus body 100 (FIG. 1), automatic exposure control is effected based on a mono-color signal which is selected from RGB of the RGB image input signals supplied from color image input unit 110 or CMY, as shown in FIG. 3. The mono-color signal after the processing of input tone correcting portion 13 is converted into the K signal, which is in turn subjected to a series of processes through spatial filtering processor 16, output tone correcting portion 17, tone reproduction (halftone generation) processor 18 and area separating portion 19, and the processed signal is output.

Now, input tone correcting processor 13 of the present invention will be described. In the description hereinbelow, the processing using one mono-color signal selected from CMY will be explained.

Figure 4:
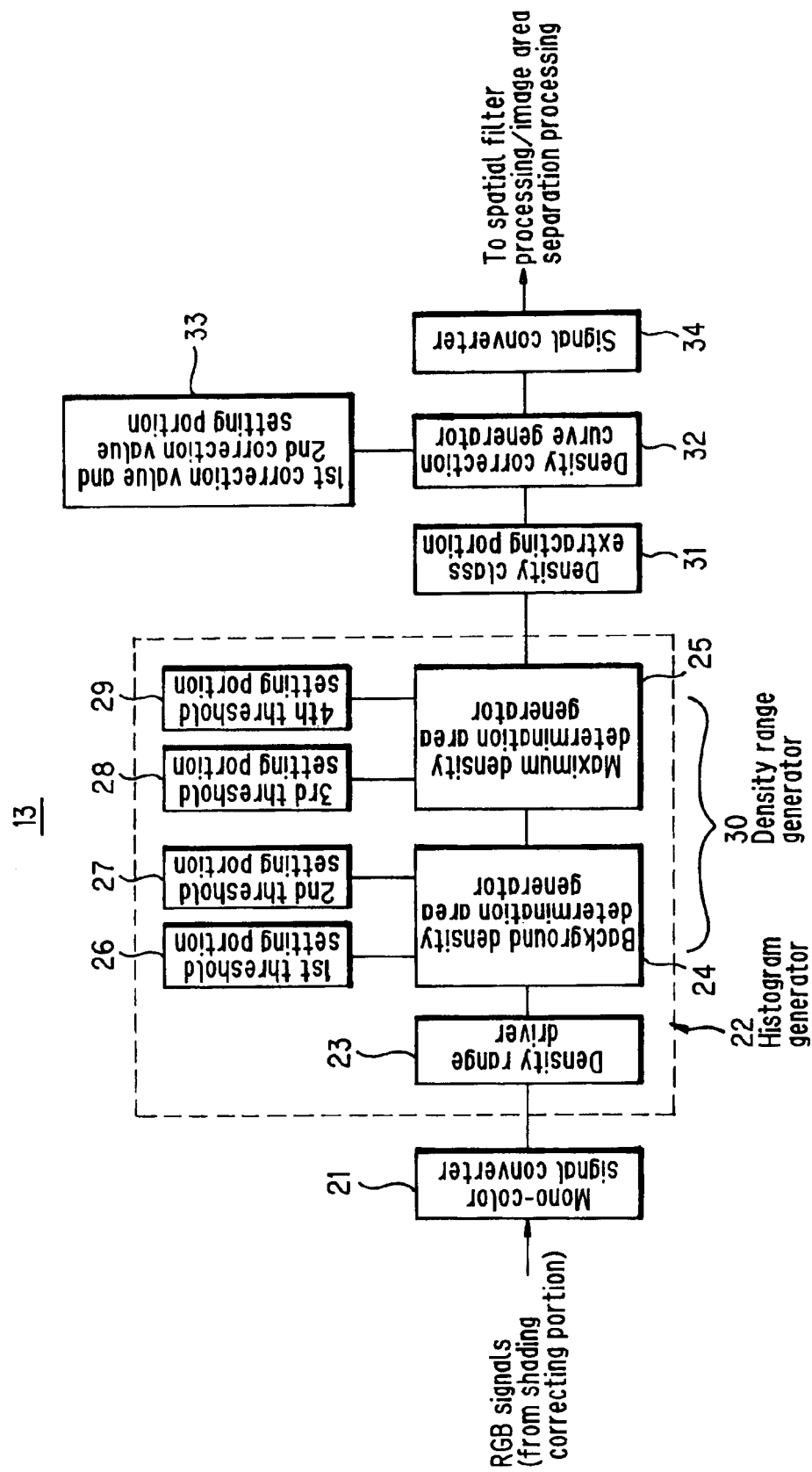
FIG. 4 is a block diagram showing the portion for effecting input tone correction, in accordance with one embodiment of an image processing apparatus of the present invention.

As shown in FIG. 4, input tone correction processor 13 is configured of a mono-color signal converter 21 for extracting a mono-color signal of the CMY system from the RGB signals, a histogram generator 22 for generating the density histogram based-on the density of the pixels of the digital image, a density class extracting portion 31 for extracting the density class of the background density and the density class of the maximum density, a density correction curve generator 32 for generating a density correction curve based on the result from density class extracting portion 31, correction value setting portion 33 for arbitrarily setting the first and second correction values corresponding to the starting point and end point for generation of the density correction curve, and signal converter 34 for converting the mono-color signal into the K signal.

Histogram generator 22 includes a density range divider 23 for dividing the density range into the predetermined number of classes and a density range generator 30 for selecting the target areas of the background density and the maximum density.

Density range generator 30 is configured of a background density determination area generator 24 and a maximum density determination area generator 25. This background density determination area generator 24 further includes a first threshold setting portion 26 for setting the threshold of the background density value and a second threshold setting portion 27 for setting the threshold of the number of pixels (frequency) based on which the background is determined. Maximum density determination area generator 25 includes a third threshold setting portion 28 for setting the threshold of the maximum density value and a fourth threshold setting portion 29 for setting the threshold of the number of pixels (frequency) based on which the maximum density is determined. Background density determination area generator 24 selects the density range to be the target for background density determination based on the thresholds set by first and second threshold setting portions 26 and 27. Maximum density determination area generator 25 selects the density range to be the target for maximum density determination based on the thresholds set by third and fourth threshold setting portions 28 and 29.

Figure 5:
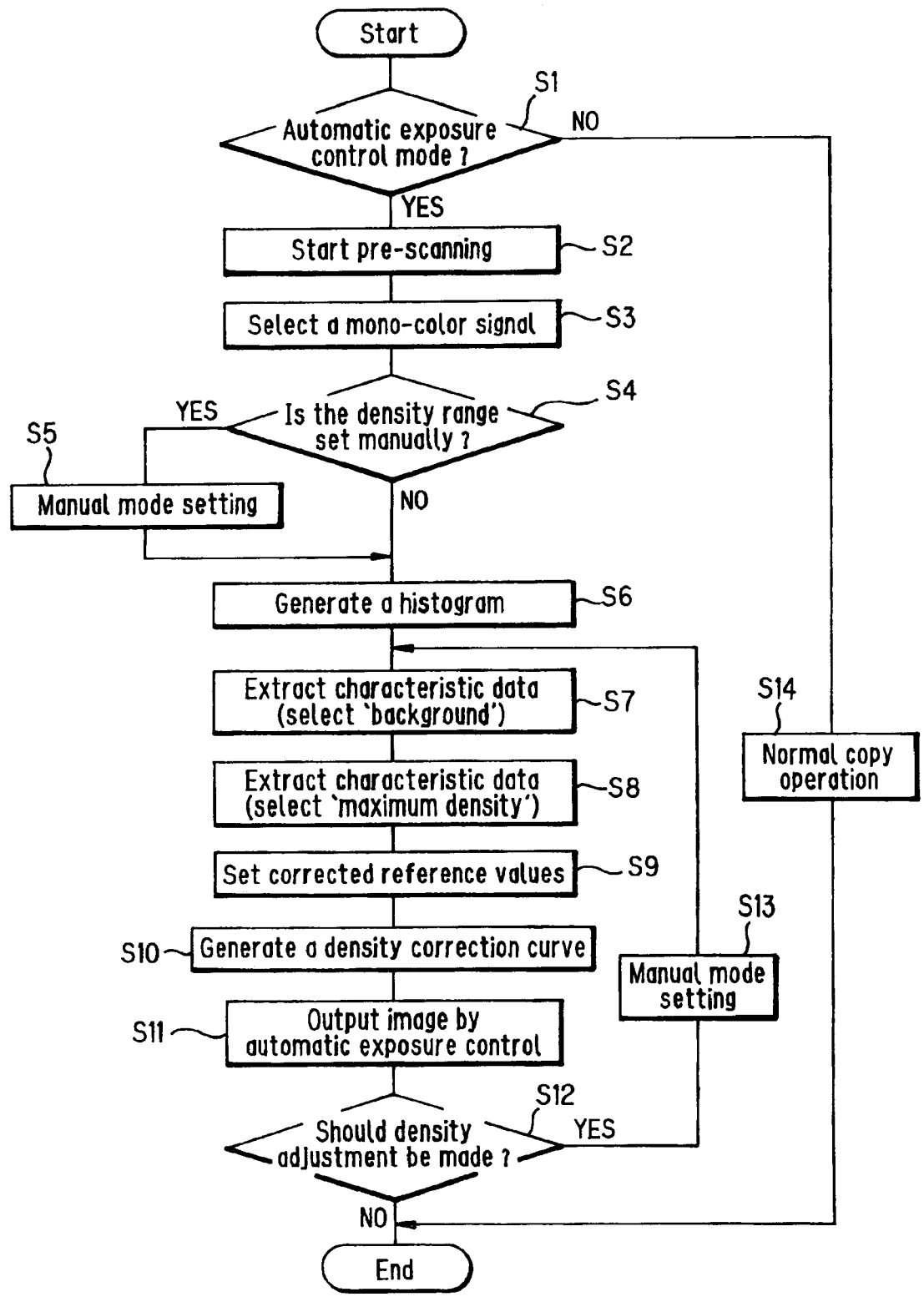
FIG. 5 is a flowchart showing the operation flow of an image processing method effected by the above image processing apparatus.

FIG. 5 is a flowchart showing the operation flow of the input tone correcting process (automatic exposure control). First, when the 'automatic exposure control mode' is designated through the control portion (not shown) in image forming apparatus body 100 (Step S1: to be mentioned as 'S1' hereinbelow), pre-scanning is started (S2) and a mono-color signal (e.g., M signal) is selected from the RGB signals of all the pixels of the read original (S3). Here, designation of the 'automatic exposure control mode' can be done through a setting button for the automatic exposure control mode which is provided on the control portion (not shown) in image forming apparatus body 100.

Upon extraction of the density areas for 'background' and 'maximum density', it is judged whether the density range is determined manually (S4). For the selection of the density range, the first threshold for 'background' has been set beforehand by first threshold setting portion 26 (FIG. 4) while the third threshold for 'maximum density' has been set beforehand by third threshold setting portion 28 (FIG. 4). However, if manual setting is performed, the setting of the density range in 'manual mode' should be done (S5).

The detailed way of setting the density range will be described later.

Next, histogram generator 22 (FIG. 4) generates a density histogram, based on the selected mono-color signal for all the pixels of the read original (S6). The detailed operation of histogram generator 22 will be described later. Based on the mono-color signal from mono-color signal converter 21, the variable range of the density values is divided into arbitrary density classes by means of density range divider 23, the frequency of each density class is counted. Based on the density classes, background density determination area generator 24 defines the first density area, the background density determination area by the first threshold and the second threshold while maximum density determination area generator 25 defines the second density area, the maximum density determination area by the third threshold and the fourth threshold. In this way, the density histogram for determining 'background' and 'maximum density' is prepared.

Referring to the thus generated density histogram, density class extracting portion 31 (FIG. 4) extracts the density class corresponding to 'background(the first reference value)' based on the first and second thresholds set beforehand by first and second threshold setting portions 26 and 27(S7) and also extracts the density class corresponding to 'maximum density (the second reference value)' based on the third and fourth thresholds set beforehand by third and fourth threshold setting portions 28 and 29(S8).

The density classes of the 'background' and 'maximum density' thus determined by density class extracting portion 31 are sent to density correction curve generator 32, where they are added respectively with the first and second correction values which have been set beforehand by correction value setting portion 33, to determine the first and second corrected reference values (S9). These first and second corrected reference values may be manually set as desired. Then, density correction curve generator 32 creates a density correction curve, using the first and second corrected reference values (S10). Based on the density correction curve thus generated the image is output (S11).

Then, it is judged whether the output image should be further subjected to density adjustment (S12). If a further density adjustment is needed, the second threshold and/or the fourth threshold is set in 'manual mode' (S13) and hence 'background' and 'maximum density' are selected (S7 and S8) and the corrected reference values are set (S9) and the density correction curve is generated again (S10). When no further density adjustment is needed, the processing sequence is ended.

Upon the extraction of the density class of 'background' by means of density class extracting portion 31, the second threshold has been set beforehand by means of second threshold setting portion 27. Upon the extraction of the density class of 'maximum density', the fourth threshold has been set beforehand by means of fourth threshold setting portion 29. However, these second and fourth thresholds may be selected manually.

Figure 6:
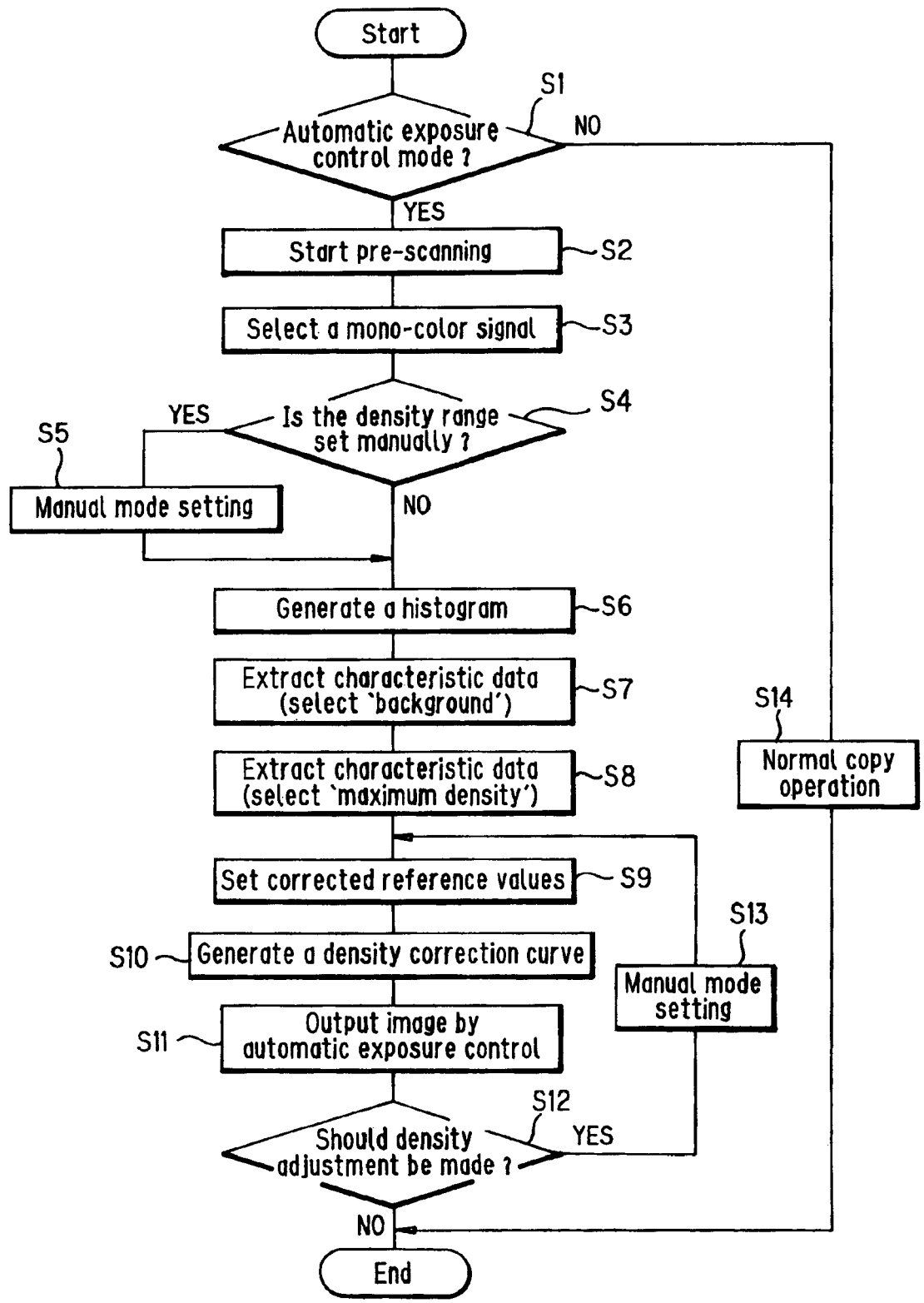
FIG. 6 is a flowchart showing the operation flow of another image processing method effected by the above image processing apparatus.

It should be noted that when the 'automatic exposure control mode' is not selected on the control portion (not shown) of the image forming apparatus body 100, the normal copying operation is effected (S14). In the above embodiment, the threshold (the reference vales) set beforehand for the selection of 'background' and 'maximum density' (S7 and S8) are modified in the 'manual mode' when density adjustment (S12) is effected. However, the corrected reference values may be modified instead. FIG. 6 is a flowchart showing the operation flow of input tone correcting process (automatic exposure control) by modifying the correction reference values for 'background' and 'maximum density'. In FIG. 5, the background set at S7 and the maximum density value set at S8 are modified manually when the density adjustment is performed at S12. In FIG. 6, the corrected reference values may also be modified. The detail will be described later. The process sequence is the same as in FIG. 5, so the description is omitted.

Next, determination of 'background' and 'maximum density' based on the density histogram and generation of the density correction curve based on the determination result will be described in detail with reference to the drawings shown in FIGS. 7 to 11.

Figure 7:
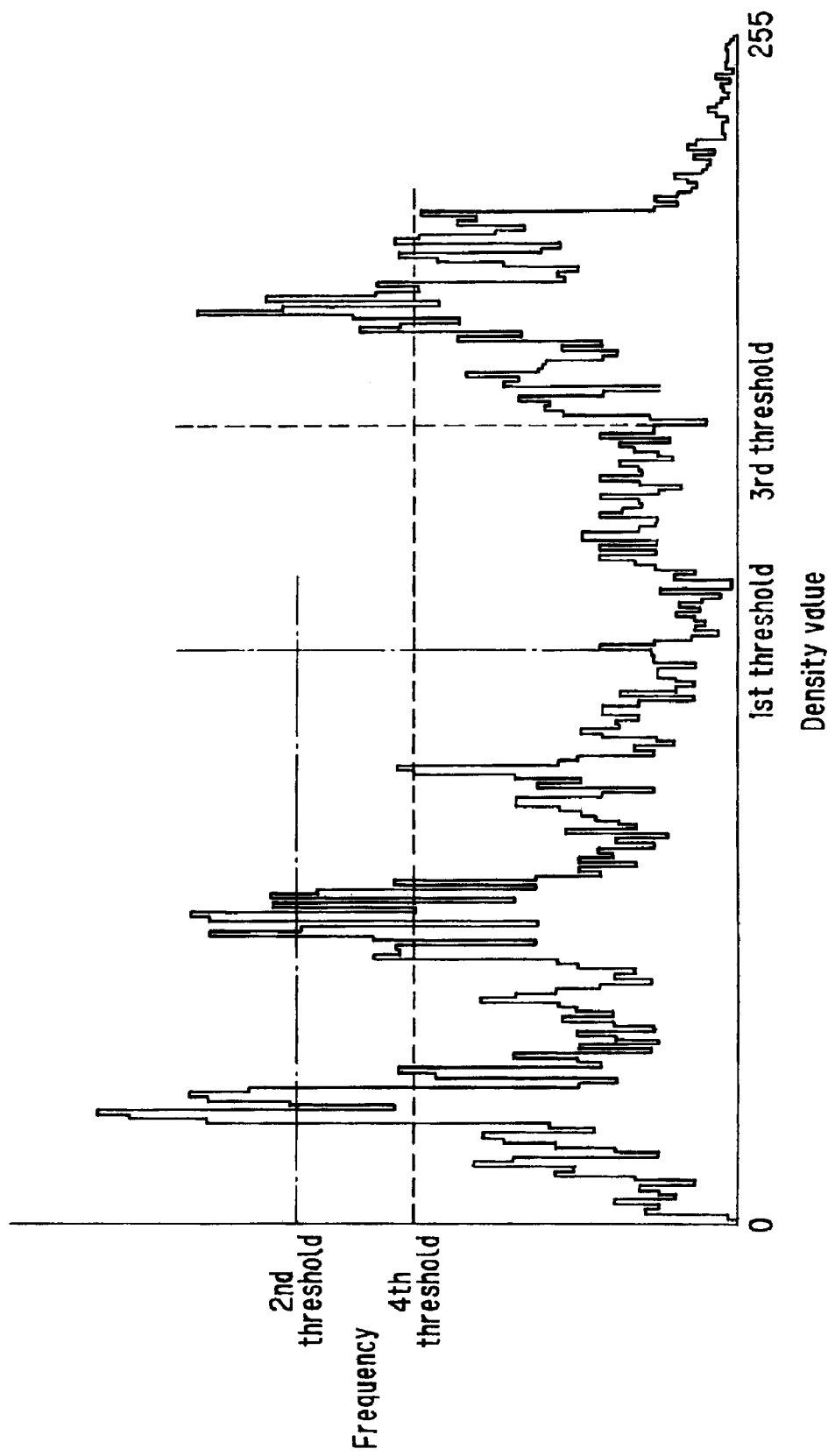
FIG. 7 is a density histogram generated by the above image forming apparatus, wherein the pixel density value range is divided into 256 steps.
Figure 8:
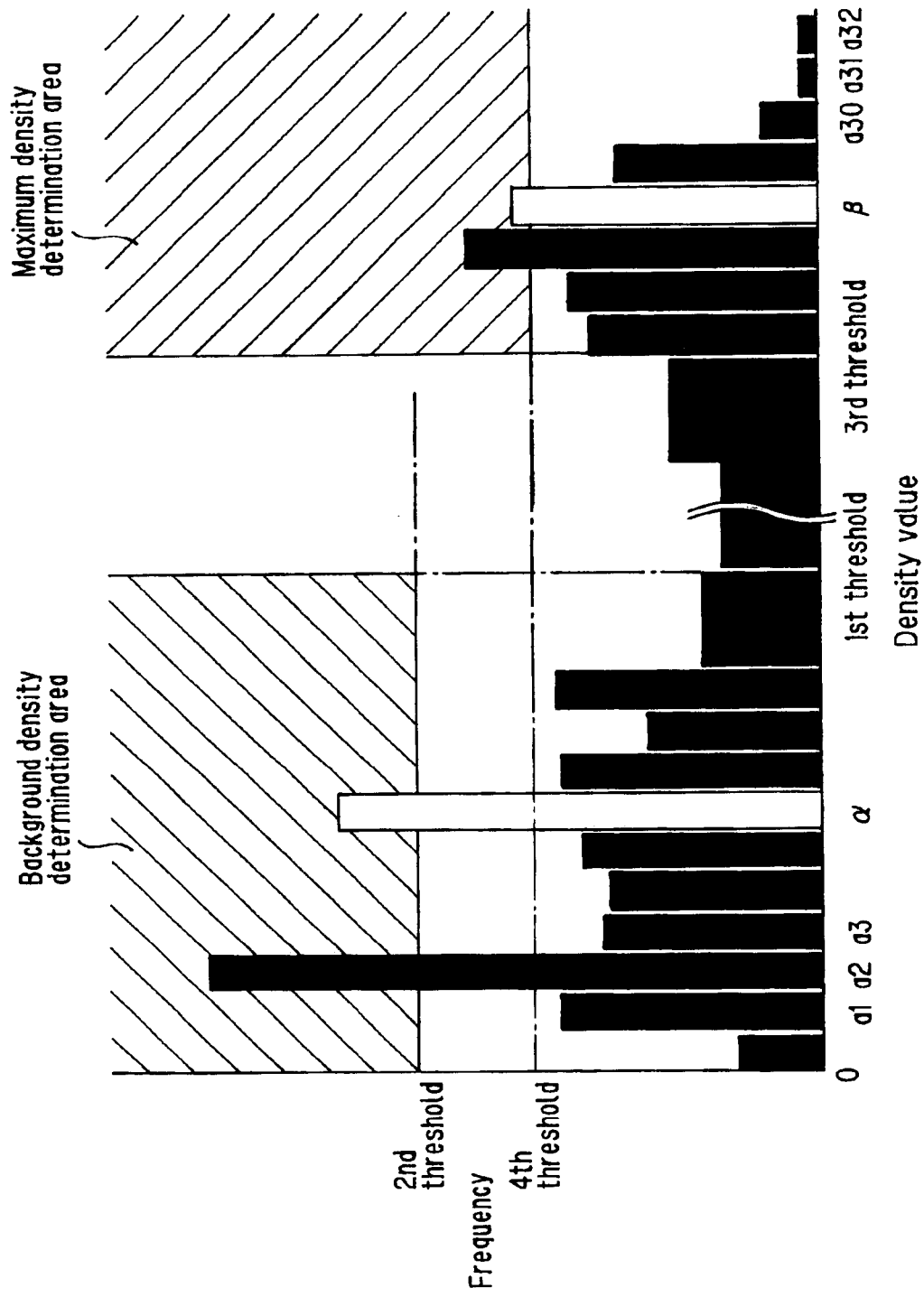
FIG. 8 is a chart showing a density histogram wherein the pixel density value range is divided into 32 steps when the background and the maximum density are determined by the above image processing apparatus.

FIGS. 7 and 8 show generated examples of density histograms. The density histogram shown in FIG. 7 is one that is normally generated, where density frequencies are represented in 256 steps. In the embodiment of the present invention, the density histogram is simplified by reducing the number of classes divided by density range divider 23 (FIG. 4) from 256 steps to 32 steps (density classes: a1, a2 ... a32), as shown in FIG. 8, for example. This enables remarkable simplification of the hardware configuration. Upon the class division, it is not necessary to divide the widths of the density classes equally, but the part needing more information may be divided finely. Further, the number of divisions may be increased as required so as to enable more exact process.

As shown in FIG. 8, density range divider 23 divides the low and high density ranges into density classes of a small width and the middle density range into density classes of a large width. As described heretofore, for every pixel scanned by pre-scanning, the histogram frequency of the density class to which each density value belongs is incremented. In this case, if the density classes vary in width, the frequency for each density class should be computed by taking the average, so as not to yield difference due to different class widths. Specifically, as shown in FIG. 8, if a certain class 'ai' has a density class width 'bi', the frequency 'Hi' for an arbitrary density class 'Di' can be determined by the following formula:

$$Hi = \Sigma\ hj/bi$$

where hj: the frequencies of the classes that belong to Di, into which the total density range is divided by 256.

In this way, the density histogram divided into varying density classes can be generated by density range divider 23.

Based on the density histogram thus generated, density range generator 30 (FIG. 4) generates the background density determination area and the maximum density determination area shown in FIG. 8. More specifically, background density determination area generator 24 defines the area with the density equal to or lower than the first threshold and the frequency equal to or greater than the second threshold, as the background density determination area. Maximum density determination area generator 25 defines the area with the density equal to or higher than the third threshold and the frequency equal to or greater than the fourth threshold, as the maximum density determination area. Based on these areas, density class extracting portion 31 extracts the density classes corresponding to the image background and the maximum density in the image.

In this way, for judgement of 'background', it is necessary to designate the maximum density or the density threshold below which a density value may be determined as 'background'. Therefore, the maximum of the density values which can be determined as 'background' should be set beforehand as the first threshold. It is also necessary to determine how frequent pixels of a density class should appear to determine the density class as 'background' of the image. In other words, the minimum of the number of pixels to be determined as 'background' should be set beforehand as the second threshold. That is, the first and second thresholds will be the basis of control, so that it is possible to widen the processing range when these thresholds are controlled. For these thresholds, when expected, multiple values have been stored beforehand in ROM or the like, the data can be read out from the ROM, as necessary, by the operation of a switch or the like so that the read data can be stored into another storage means such as memory. Alternatively, it is possible to configure a system in which the thresholds can be set arbitrarily by the user.

Figure 9:
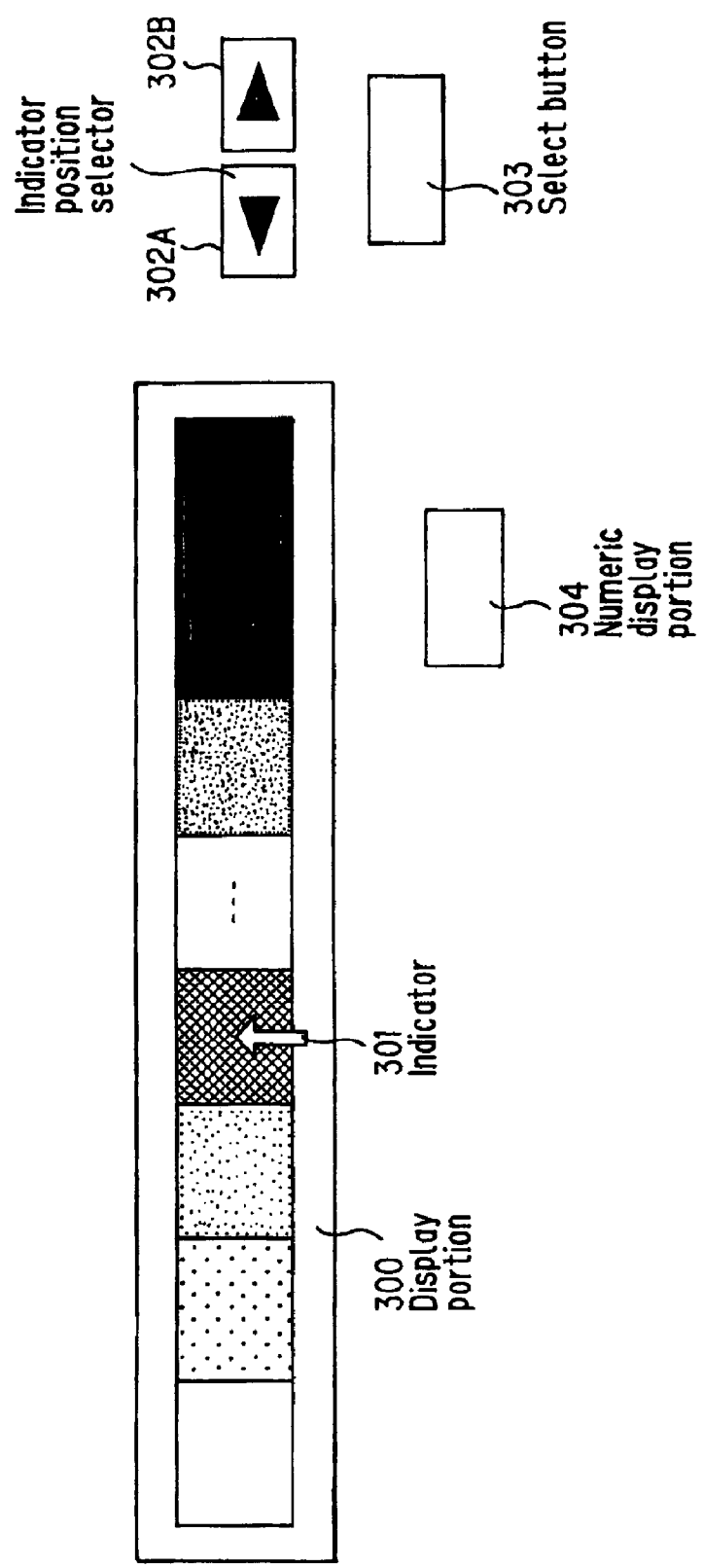
FIG. 9 is an illustrative view showing a configuration of the control portion of a digital color copier for allowing arbitrary designation of the first and third thresholds when a density histogram is generated by the above image processing apparatus.

For example, as shown in FIG. 9, a band-like density scale having 256 density steps may be displayed on a display portion 300 such as a liquid crystal display (LCD) panel in the control portion (not shown) of digital color image forming apparatus 100 while an indicator 301 is given on this band-like display portion 300. An indicator position selector made up of a pair of control buttons 302A and 302B, for example, is provided so that the operator can shift indicator 301 left and right and select the desired density position by pressing a select button 303. The density value may be displayed in a numeric display portion 304 and may be stored in a storage means such as memory.

In this way, it becomes possible to easily modify the reference value under which a density value is allowed as 'background' as well as to remove 'background' or output 'background' for a target background even if it has any density.

In the above embodiment, although selection of a density value was described using an example of the band-like density scale with 256 density steps being displayed on display portion 300, this configuration should not limit the present invention. As other examples, the scale may be displayed at intervals of a certain number of density steps. Also in the above description, two control buttons 302A and 302B are used as the indicator position selector to select the position of indicator 301, but a mouse may be used for density selection.

Figure 10:
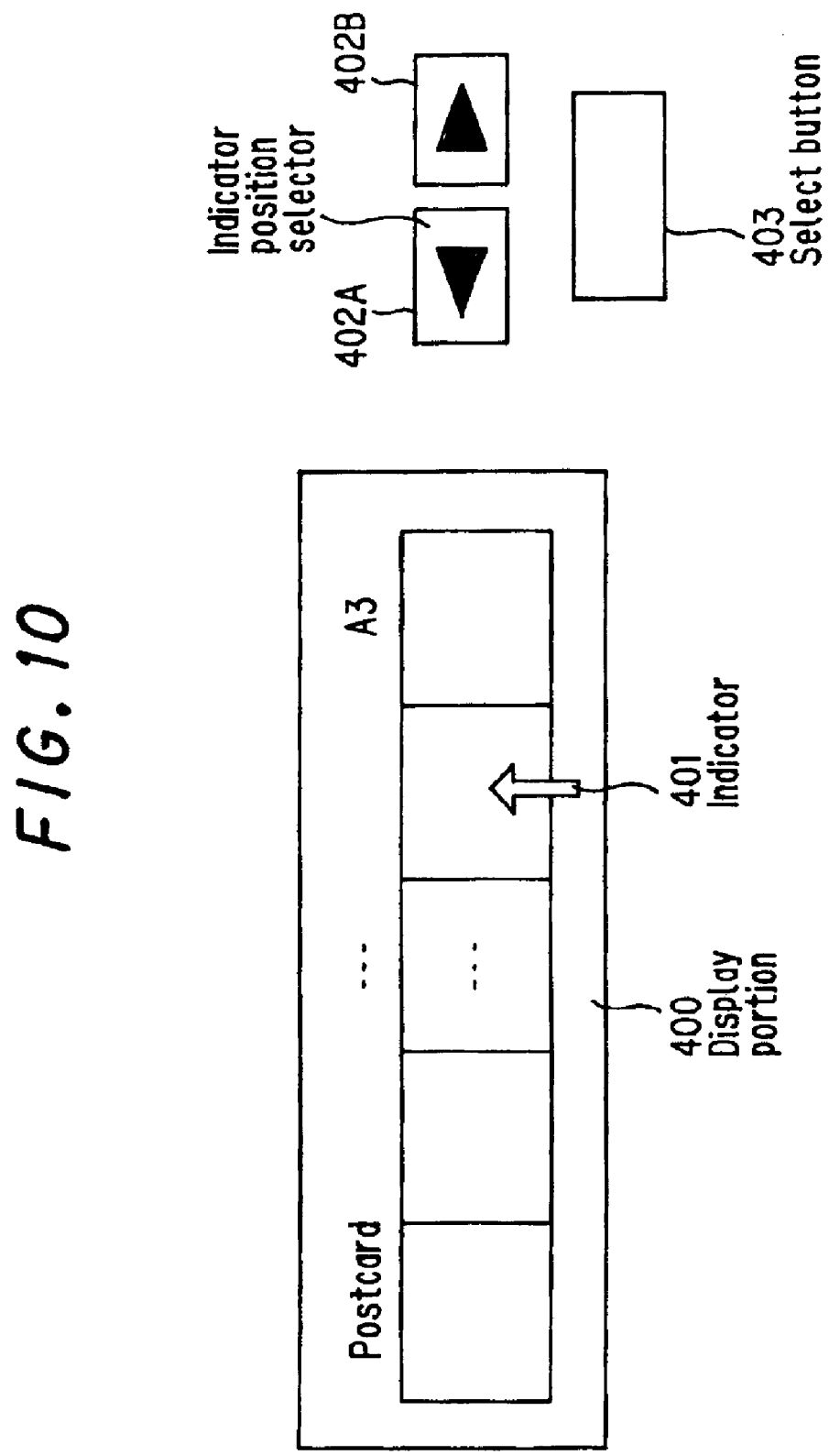
FIG. 10 is an illustrative view showing a configuration of the control portion of a digital color copier for allowing arbitrary designation of the second and fourth thresholds when a density histogram is generated by the above image processing apparatus.

Similarly for the adjustment of the second threshold, a display portion 400 such as a LCD panel in the control portion (not shown) of digital color image forming apparatus 100 may be provided as shown in FIG. 10 so as to allow for selection. This display portion 400 displays the sizes of the 'background' to be subjected to a removal process, using a band-like indicator, from the minimum, 'postcard' size to the maximum, 'A3' size, for example. This display portion 400 is provided with an indicator 401, which can be shifted left and right by using an indicator position selector made up of a pair of control buttons 402A and 402B as Illustrated, or by a mouse or the like. The second threshold is determined by pressing a select button 403 when the indictor is placed at the desired 'background' size. The number of pixels corresponding to the thus selected 'background' size is stored in the storage means such as memory.

In this way, it becomes possible to easily modify the reference value of the frequency, based on which whether or not pixels of a density class can be determined as 'background' as well as to remove 'background' or output 'background' for a target background even if it is of any size.

In the case where the maximum density of an original in the output image needs to be determined, it is necessary to designate the minimum density, or the density threshold above which a density value may be determined to be the maximum density. Therefore, the minimum of the density values which can be determined as the maximum density should be set beforehand as the third threshold, using third threshold setting portion 28.

It is also necessary to determine how frequent pixels of a density class should appear to determine the required density. In other words, the minimum of the number of pixels to be required for the output image should be set beforehand as the fourth threshold using the fourth threshold setting portion 29.

These third and fourth thresholds will be the basis of control, so that it is possible to widen the processing range when these thresholds are controlled. For the third threshold, with expected, multiple values, which have been stored beforehand in ROM or the like, the data can be read out, as necessary, by the operation of a switch or the like so that the read data can be stored into another storage means such as a memory. Alternatively, a LCD panel or the like may be provided on the control portion (not shown) of digital color image forming apparatus 100 to display the third threshold as shown in FIG. 9, so that the operator can arbitrarily select the level.

Also as to the fourth threshold, it is possible to configure such a system that expected, multiple values have been stored beforehand in ROM or the like so that the value to be stored into the storage means such as a memory can be selected based on a signal, for example, size detection signal of an original placed on the original set surface of original table 111 of digital color image forming apparatus 100, or based on the detection signal from a recording medium (paper P) selecting button arranged on the control portion (not shown). Alternatively, similarly to the case of adjusting the second threshold as shown in FIG. 10, the user may be allowed to designate the threshold arbitrarily through the control portion (not shown) of digital color image forming apparatus 100.

In a case where the first to fourth thresholds are input through the control portion of digital color image forming apparatus 100 as shown in FIGS. 9 and 10, the display portion in the control portion displays a message, for example, 'please select a thin color' or the like and promotes the user to input the associated thresholds, successively. Thus, the user only needs to perform work following the message.

Further, in order to prevent malfunction from occurring when an erroneous value is input, the first and third thresholds are regulated by the upper limit and lower limit, respectively. If, beyond the allowable range, too high a value as the 'background' density is input or if too low a value as the maximum density is input, such input is rejected and an error message will be displayed. Further, upon the input of the first and third thresholds, since an erroneous value could be input through the control portion, shown in FIG. 9, of digital color image forming apparatus 100, similar rejection as above will be made.

In the example of a density histogram shown in FIG. 8, the density values not greater than the first threshold and presenting a frequency equal to or greater than the second threshold are determined to be acceptable as 'background' while the density values equal to or greater than the third threshold and presenting a frequency equal to or greater than the fourth threshold are determined to be acceptable as 'maximum density' of the original.

When a multiple number of density classes have been determined to be acceptable as 'background', the most suitable density class as 'background' should be selected from the acceptable area as 'background' (background density determination area). Forth is purpose, the class value which is not greater than the first threshold, has a frequency equal to or greater than the second threshold and still be closest to the first threshold, that is, has the highest density value, is selected. Search of the density class value to be determined as 'background' can be done by comparing the frequency of each density class value with the second threshold, in either direction from the low-density side or the high-density side close to the first threshold. However, it is preferred if the comparison is started from the high-density side close to the first threshold. This enables smooth and quick selection of the density class value having a frequency equal to or higher than the second threshold, closest to the first threshold and presenting the highest density.

In a similar manner, when a multiple number of density classes have been determined to be acceptable as 'maximum density' of an original, the density class having the highest density should be selected from the acceptable area as 'maximum density' (maximum density determination area). For this purpose, the class value which is equal to or greater than the third threshold, has a frequency equal to or greater than the fourth threshold and still have the highest density value (or is the farthest from the third threshold) is selected. Search of the density class value to be determined as 'maximum density' of an original can be done in a similar manner. That is, the comparison is started from the high-density side, thus enabling smooth and quick selection of the highest density class value that is equal to or greater than the third threshold and has a frequency equal to or higher than the fourth threshold.

In the density histogram shown in FIG. 8, the density class value $\alpha$ is determined as 'background' while the density class value $\beta$ is determined as 'maximum density' so that these density class values $\alpha$ and $\beta$ are input as the first and second reference values, respectively. The thus determined first reference value is added with the first correction value which has been determined beforehand while the second reference value is added with the second correction value which has been determined beforehand, to prepare the first corrected reference value and the second corrected reference value.

The aforementioned, first reference value is located in the center of the specified density class range. The second reference value is also located in the center. That is, 'background' and 'maximum density value' both have density distributions. Therefore, for 'background', a value slightly higher than the first reference value is selected so as to remove 'background', positively. For the 'maximum density value', a value is determined by adding a second correction value to the second reference value, taking into account the density values higher than the second reference value. With these settings, it is possible to provide a high quality image having high enough density free from fogging.

Figure 11:
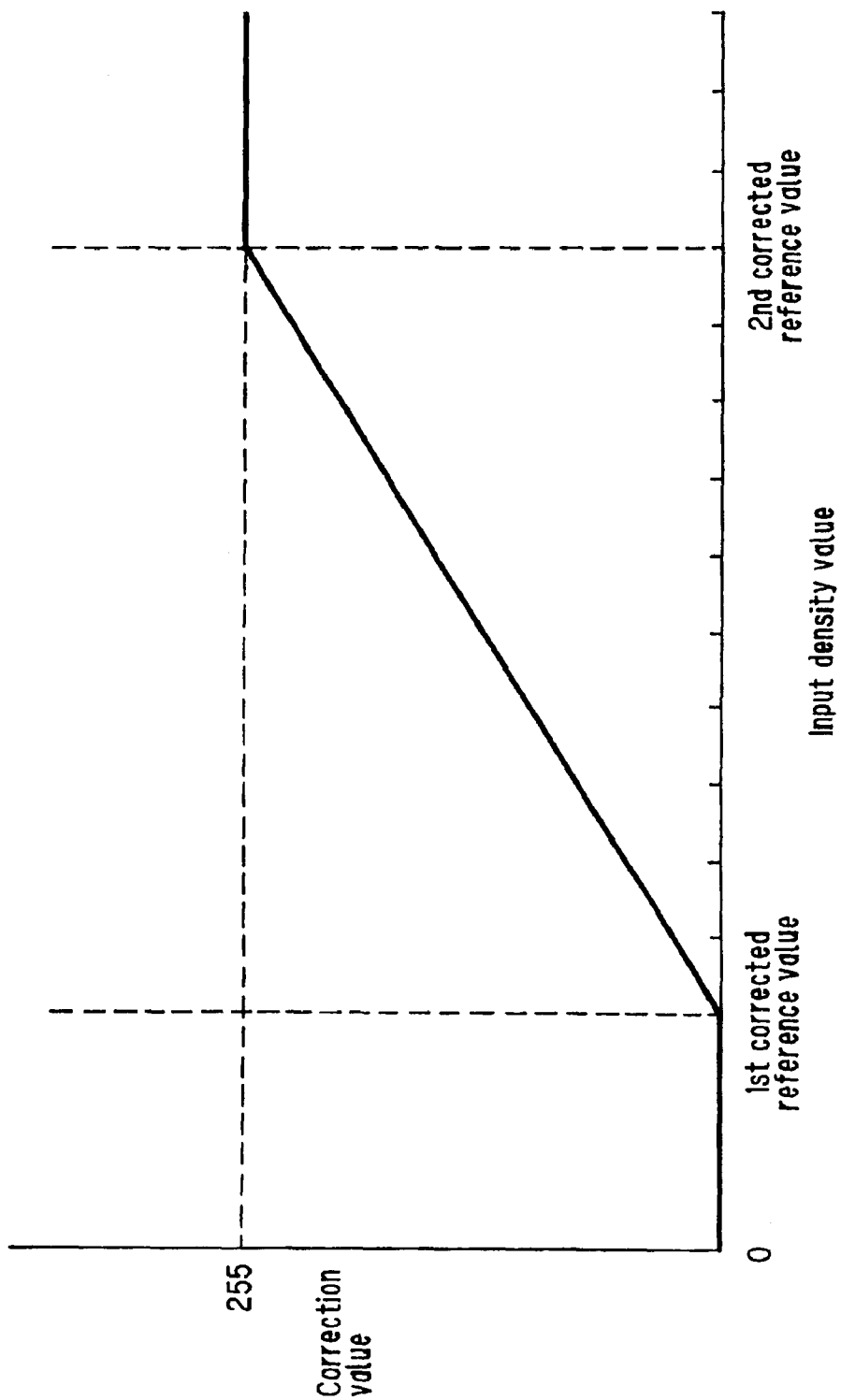
FIG. 11 is a chart of characteristics showing an example density correction curve generated by the density correction curve generator of the above image processing apparatus.

When the density classes designated by the first corrected reference value and the second corrected reference value are determined as stated above, a density correction curve as shown in FIG. 11 is produced. First, the starting point of the density correction curve is set at the first corrected reference value or the density value which is the sum of the first reference value, which has been determined as 'background', and the first correction value. If there is no density class which corresponds to 'background', the starting point of the curve is set at the input density value '0'. The end point of the density correction curve is set at the second corrected reference value or the density value which is the sum of the second reference value, which has been determined as 'maximum density' of the original, and the second correction value. If there is no corresponding density class, the end point of the density correction curve is set at the third threshold.

With the thus determined starting point set at density value '0' and the end point set at density value '255', the two points are joined by a straight line, thus forming a density correction curve as shown in FIG. 11. In this case, the density correction curve is assumed as being linear, but this should not limit the present invention. Any curve can be used as appropriate. Since a density correction curve can be generated for each input image, it is possible to produce more optimized images while the hardware configuration can be markedly simplified.

When the actual scanning of digital color image forming apparatus body 100 starts, based on the density correction curve as shown in FIG. 11, for example, variation in density value equal to or lower than the starting point (the first corrected reference value) and variation in density equal to or higher than the end point (the second corrected reference value) are removed, whereby it is possible to produce an optimized image with its corrected destiny values corresponding to the input values. In some cases, a certain user may want to produce an image of their own tastes. In such a case, the user can manually operate unillustrated exposure control buttons, provided in the control portion of digital color image forming apparatus body 100 in the same form as shown in FIG. 9, for example, so as to adjust the starting point (the first corrected reference value) and the end point (the second corrected reference value), based on the generated density correction curve, to the lower and higher densities. Thus, it becomes possible for the user to output their own favorite images.

When the starting point (the first corrected reference value) and the end point (the second corrected reference value) upon the generation of the density correction curve are adapted to be shifted in steps of a constant value to the lower density side and to the higher density side, the manual adjustment of the density correction curve can be carried out in a simple manner. This configuration allows for simple production of images which are more optimized.

In the above embodiment, a case where a mono-color signal selected from CMY is used has been described, but a mono-color signal selected from the RGB system may be employed. In this case, the density values in the density histogram, which are equal to or greater than the first threshold and present a frequency equal to or greater than the second threshold are determined to be acceptable as 'background' while the density values in the histogram which are not greater than the third threshold and present a frequency equal to or greater than the fourth threshold are determined to be acceptable as 'maximum density' of an original.

In this case, the most suitable density class as 'background' should be selected-from the acceptable area as 'background'. For this purpose, the class value (the first reference value) which is equal to or greater than the first threshold, has a frequency equal to or greater than the second threshold and is still closest to the first threshold, that is, has the lowest density value, is selected as the most suitable. Similarly, the most suitable density class as. 'maximum density' of an original should be selected from the acceptable area as 'maximum density' of the original. For this purpose, the class value (the second reference value) which is not greater than the third threshold, has a frequency equal to or greater than the fourth threshold and is most distant from the third threshold, that is, has the lowest density value, is selected as the most suitable. Other processing sequences are carried out in the same manner as that for the mono-color signal of the CMY system.

In the above embodiment, the automatic density control in the image processing apparatus of the present invention was discussed using an example of an image forming apparatus based on a pre-scanning configuration. However, the present invention should not be limited to this. For example, it is possible to configure a system in which the input data is divided into two branches, one of which is temporarily stored into a storage means such as an image memory while the other is used to perform automatic density control and determine the density correction curve as in the present invention, whereby the input data is read out from the storage means to output a corrected image.

Though the above embodiment was discussed using an example of a digital color copier based on the electrophotographic process as an image forming apparatus, the present invention can be applied to image forming apparatus of ink-jet recording types, sublimation recording types as long as the image forming apparatus receives the data from the image input device and subjects the image data to the predetermined image processes and outputs the resultant image.

Other than the above, many modifications and variations can be made obviously without departing from the scope of the present invention.

As has been apparent from the above description, according to the present invention, a density class which is closest to the first threshold, of all the density classes which belong to the background density determination area are determined as the background density while a density class which is farthest from the third threshold, of all the density classes which belong to the maximum density determination area are determined as the maximum density, so as to perform density correction based on the density classes of the background and the maximum density. Therefore, it is possible to provide the optimized tone processing for any image and hence produce a high-quality preferable output image.

Since the frequencies in the background density determination area are sequentially compared with the second threshold, in the direction departing from the first threshold so as to determine the first density class having a frequency over the second threshold as the background density, it is possible to easily and smoothly determine the 'background'.

Since the frequencies in the maximum density determination area are sequentially compared with the fourth threshold, in the direction approaching the third threshold so as to determine the first density class having a frequency over the fourth threshold as the maximum density, it is possible to easily and smoothly determine the 'maximum density' of an original.

Further, density correction is performed by generating a first corrected reference value based on the first reference value, i.e., the density class which has been determined as the background density, generating a second corrected reference value based on the second reference value, i.e., the density class which has been determined as the maximum density, and generating a density correction curve starting from the first corrected reference value and ending at the second corrected reference value to perform density correction based on the density correction curve. Therefore, it is possible to precisely produce an optimized density correction curve for each input image. Moreover, since the processing speed can be enhanced while the circuit scale can be reduced, the hardware configuration can be markedly simplified.

Finally, since the first and second correction values can be adjusted arbitrarily, the reference points upon the generation of a density correction curve can be easily adjusted, thus making it possible to produce an output image satisfying user tastes.

What is claimed is:

1. An image processing method for density correction of a digital image by converting input analog image signals into digital image signals, generating a pixel density histogram from the digital image and making density correction of the digital image based on the generated density histogram, wherein, for the density histogram, the first threshold representing the threshold density for the background, the second density threshold representing the minimum frequency for the background density value, the third threshold density value for the maximum density and the fourth threshold representing the minimum frequency for the maximum density have been set beforehand, the image processing method comprising the steps of:

from the total density range of the density histogram,
defining as the background density determination area the range having the density values determined based on the first threshold and having a frequency equal to or greater than the second threshold and defining as the maximum density determination area the range having the density values determined based on the third threshold and having a frequency equal to or greater than the fourth threshold;

determining as the background density a density class which is closest to the first threshold, of all the density classes which belong to the background density determination area;

determining as the maximum density a density class which is farthest from the third threshold, all of the density classes which belong to the maximum density determination area; and performing density correction based on the density classes of the background and the maximum density.

2. The image processing method according to claim 1, wherein the frequencies in the background density determination area are sequentially compared with the second threshold, in the direction departing from the first threshold so as to determine the first density class having a frequency over the second threshold as the background density.

3. The image processing method according to claim 1, wherein the frequencies in the maximum density determination area are sequentially compared with the fourth threshold, in the direction approaching the third threshold so as to determine the first density class having a frequency over the fourth threshold as the maximum density.

4. The image processing method according to claim 1, further comprising the steps of:

setting the density class which has been determined as the background density from the background density determination area, as the first reference value and adding a previously designated first correction value to the first reference value to produce a first corrected reference value;

setting the density class which has been determined as the maximum density from the maximum density determination area, as the second reference value and adding a previously designated second correction value to the second reference value to produce a second corrected reference value;

generating a density correction curve starting from the first corrected reference value and ending at the second corrected reference value; and performing density correction based on the density correction curve.

5. The image processing method according to claim 4, wherein the first and second correction values can be adjusted arbitrarily.

6. An image processing apparatus comprising:

a histogram generator which converts input analog image signals into digital image signals and generates a density histogram from the density of all of the pixels in the digital image;

a density correcting portion for making density correction of the digital image based on the histogram generated by the histogram generator; and a density class extracting portion for extracting the density classes corresponding to the background and the maximum density from all of the density classes in the density histogram generated by the generator, the histogram generator further comprising:

a density area divider for dividing the total density area of pixels of the digital image into multiple number of density classes, and a density area generator, counting the frequencies of the density classes divided by the density area divider, defining as a background density determination area the range having the density values determined based on the first threshold and having a frequency equal to or greater than the second threshold and defining as a maximum density determination area the range having the density values determined based on the third threshold and having a frequency equal to or greater than the fourth threshold, in the total density range of the density histogram, based on the first threshold representing the threshold density value for the background, the second threshold representing the minimum frequency for the background density value, the third threshold representing the threshold density value for the maximum density and the fourth threshold representing the minimum frequency for the maximum density, all having been set beforehand, wherein the density class extracting portion determines as the background density a density class which is closest to the first threshold, of all the density classes which belong to the background density determination area and determines as the maximum density a density class which is farthest from the third threshold, of all the density classes which belong to the maximum density determination area.

7. The image processing apparatus according to claim 6, wherein the density class extracting portion sequentially compares the frequencies in the background density determination area with the second threshold, in the direction departing from the first threshold so as to determine the first density class having a frequency over the second threshold as the background density.

8. The image processing apparatus according to claim 6, wherein the density class extracting portion sequentially compares the frequencies in the maximum density determination area with the fourth threshold, in the direction approaching the third threshold so as to determine the first density class having a frequency over the fourth threshold as the maximum density.

9. The image processing apparatus according to claim 6, wherein the density correcting portion sets the density class which has been determined as the background density from the background density determination area, as the first reference value and adding a previously designated first correction value to the first reference value to produce a first corrected reference value, sets the density class which has been determined as the maximum density from the maximum density determination area, as the second reference value and adding a previously designated second correction value to the second reference value to produce a second corrected reference value, generates a density correction curve starting from the first corrected reference value and ending at the second corrected reference value, and performs density correction based on the density correction curve.

10. The image processing apparatus according to claim 9, further comprising a correction value setting portion for allowing the first and second correction values to be adjusted arbitrarily.

11. An image processing method for density correction of a digital image by converting input analog image signals into digital image signals, generating a pixel density histogram from the digital image and making density correction of the digital image based on the generated density histogram, wherein, for the density histogram, the first threshold representing the threshold density for the background and the second density threshold representing the minimum frequency for the background density value have been set beforehand, the image processing method comprising the steps of:

defining as the background density determination area the range having the density values determined based on the first threshold and having a frequency equal to or greater than the second threshold, from the total density range of the density histogram;

determining as the background density a density class which is closest to the first threshold, of all the density classes which belong to the background density determination area; and performing density correction based on the density classes of the background.

12. The image processing method according to claim 11, wherein the frequencies in the background density determination area are sequentially compared with the second threshold, in the direction departing from the first threshold so as to determine the first density class having a frequency over the second threshold as the background density.

13. The image processing method according to claim 11, further comprising the steps of:

setting the density class which has been determined as the background density from the background density determination area, as the first reference value and adding a previously designated first correction value to the first reference value to produce a first corrected reference value;

generating a density correction curve starting from the first corrected reference value; and performing density correction based on the density correction curve.

14. The image processing method according to claim 13, wherein the first correction value can be adjusted arbitrarily.

15. An image processing apparatus comprising:

a histogram generator which converts input analog image signals into digital image signals and generates a density histogram from the density of all of the pixels in the digital image;

a density correcting portion for making density correction of the digital image based on the histogram generated by the histogram generator; and a density class extracting portion for extracting the density classes corresponding to the background and the maximum density from all of the density classes in the density histogram generated by the generator, the histogram generator further comprising:

a density area divider for dividing the total density area of pixels of the digital image into multiple number of density classes, and a density area generator, counting the frequencies of the density classes divided by the density area divider, defining as a background density determination area the range having the density values determined based on the first threshold and having a frequency equal to or greater than the second threshold, in the total density range of the density histogram, based on the first threshold representing the threshold density value for the background and the second threshold representing the minimum frequency for the background density value, all having been set beforehand, wherein the density class extracting portion determines as the background density a density class which is closest to the first threshold, of all the density classes which belong to the background density determination area.

16. The image processing apparatus according to claim 15, wherein the density class extracting portion sequentially compares the frequencies in the background density determination area with the second threshold, in the direction departing from the first threshold so as to determine the first density class having a frequency over the second threshold as the background density.

17. The image processing apparatus according to claim 15, wherein the density correcting portion sets the density class which has been determined as the background density from the background density determination area, as the first reference value and adding a previously designated first correction value to the first reference value to produce a first corrected reference value, generates a density correction curve starting from the first corrected reference value, and performs density correction based on the density correction curve.

18. The image processing apparatus according to claim 17, further comprising a correction value setting portion for allowing the first correction value to be adjusted arbitrarily.

* * * * *